(12) United States Patent  
Yang

(10) Patent No.: US 8,625,112 B2
(45) Date of Patent: Jan. 7, 2014

(54) THICKNESS MEASURING SYSTEM FOR MEASURING A THICKNESS OF A PLATE-SHAPED MEMBER

(75) Inventor: Xin Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/598,630

(22) Filed: Aug. 30, 2012

(65) Prior Publication Data

US 2013/0141737 A1    Jun. 6, 2013

(30) Foreign Application Priority Data

Dec. 6, 2011    (CN) .......................... 2011 1 0400621

(51) Int. Cl.
*G01B 11/28* (2006.01)

(52) U.S. Cl.
USPC ......................................... 356/630; 356/625

(58) Field of Classification Search
USPC .................................................. 356/625–640
See application file for complete search history.

(56) References Cited

U.S. PATENT DOCUMENTS

2011/0102811 A1*    5/2011    Kaneko et al. ................. 356/625

* cited by examiner

*Primary Examiner* — Tri T Ton
(74) *Attorney, Agent, or Firm* — Altis Law Group, Inc.

(57) ABSTRACT

A thickness measuring system for measuring a thickness of a planar plate-shaped member on a conveyer belt includes a processor, a first distance measurer and a second distance measurer. The first distance measurer on one side of the conveyer belt can emit and receive a first light beam parallel to the conveyer belt for reflection off the planar plate-shaped member, and calculate a first distance between the first distance measurer and the plate-shaped member. The second distance measurer on the other side of the conveyer belt can emit and receive a second light beam and a third light beam for reflection off the planar plate-shaped member, and calculate a second distance between the first distance measurer and the plate-shaped member and a third distance between the second distance measurer and the plate-shaped member.

4 Claims, 2 Drawing Sheets

THICKNESS MEASURING SYSTEM FOR MEASURING A THICKNESS OF A PLATE-SHAPED MEMBER

BACKGROUND

1. Technical Field

The present disclosure relates to thickness measuring systems, and particularly, to a thickness measuring system for measuring a thickness of a plate-shaped member.

2. Description of Related Art

For some planar plates that are used in vehicles and designed with high accuracy, it is desired to measure the thickness of the planar plates. Therefore, there is a need to provide in a production system a thickness measuring system to measure the thickness of the planar plates.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure will be described with reference to the accompanying drawings.

Figure 1:
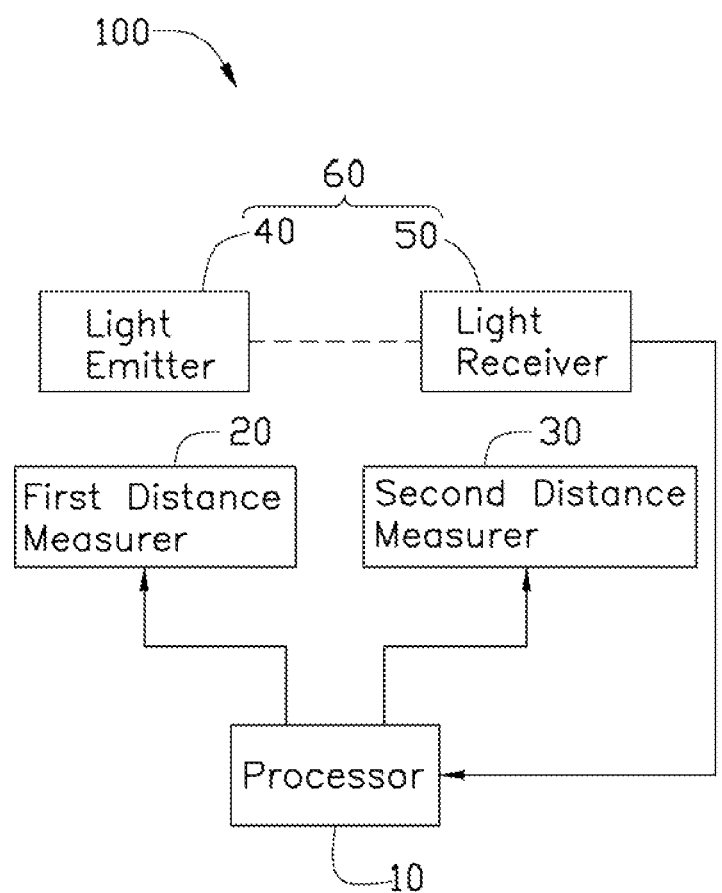
FIG. 1 is a schematic block diagram of a thickness measuring system in accordance with an embodiment.
Figure 2:
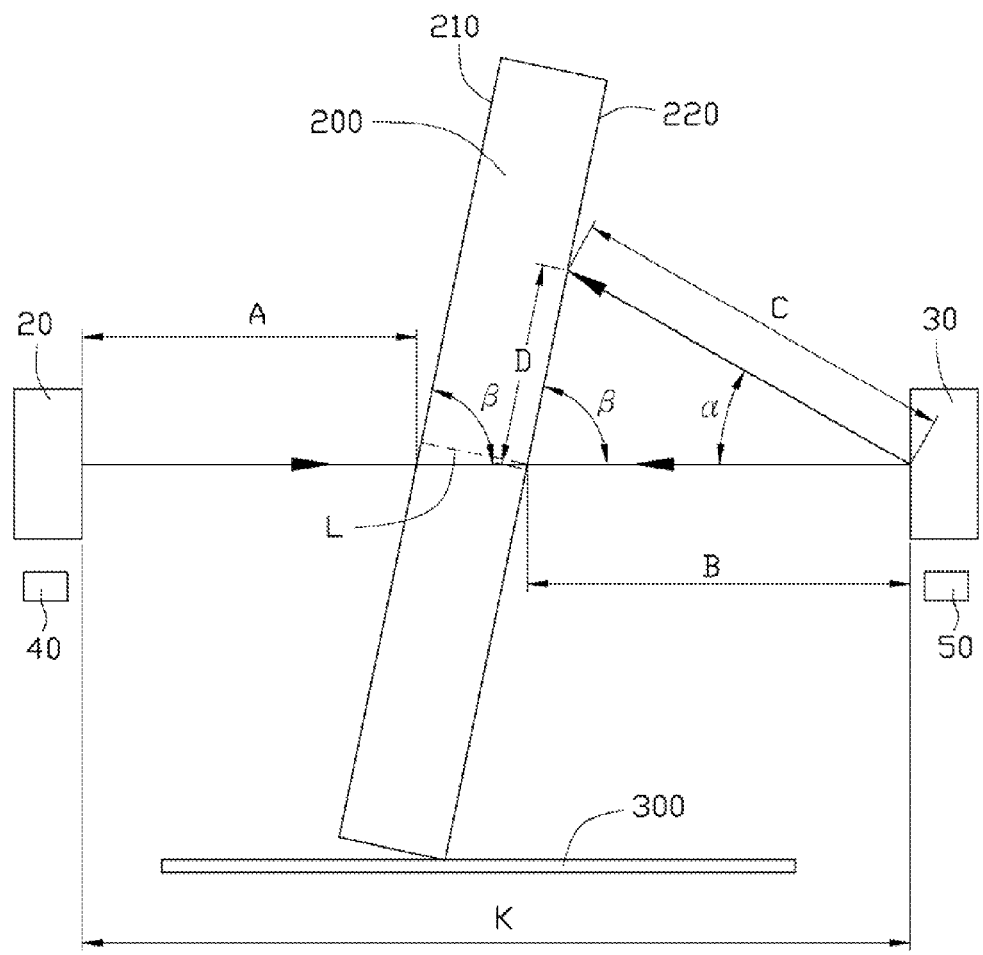
FIG. 2 a schematic principle diagram showing how a thickness of a plate-shaped member is measured by the thickness measuring system of FIG. 1.

Referring to FIGS. 1 and 2, a thickness measuring system 100 for measuring the thickness of a planar plate-shaped member 200 is provided. The thickness measuring system 100 includes a processor 10, a first distance measurer 20, a second distance measurer 30, and a plate-shaped member detecting sensor 60. The plate-shaped member 200 includes a first side 210 and a second side 220 that are parallel to each other. During a measuring process, the plate-shaped member 200 is placed on a conveyer belt 300 and moves past between the distance measurers 20 and 30. In the embodiment, the distance measurers 20 and 30 are arranged at opposite sides of the conveyer belt 300.

In the embodiment, the distance measurers 20 and 30 are laser distance measuring sensors. When needed, the distance measurers 20 and 30 may be infrared distance measuring sensors. The plate-shaped member detecting sensor 60 includes a light emitter 40 and a light receiver 50 that are arranged adjacent to the distance measurers 20 and 30. The light emitted by the light emitter 40 is received by the light receiver 50. When the plate-shaped member 200 passes between the distance measurers 20 and 30, the light from the light emitter 40 is blocked, and the light receiver 50 signals the processor 10.

Upon receiving the signal from the receiver 50, the processor 10 controls the first distance measurer 20 and the second distance measurer 30 to emit light. Specifically, the first distance measurer 20 is controlled to emit a first light beam that is across and parallel to the surface of the conveyer belt 300. After reflection by the plate-shaped member 200, the first light beam is received by the first distance measurer 20. The first distance measurer 20 records the time that the first light beam takes during the journey, and calculates a first distance A by multiplying the time according to the velocity of the first light beam. The second distance measurer 30 is controlled to emit a second light beam and a third light beam. The second light beam is parallel to the conveyer belt 300 and a first angle α is formed between the second light beam and the third light beam. After reflection by the plate-shaped member 200, the second light beam and the third light beam are received by the first distance measurer 20. The first distance measurer 20 records the respective times that the second light beam and the third light beam take during the journey, and calculates a second distance B and a third distance C by multiplying the time by the velocity of the second light beam and the third light beam.

The processor calculates an angle β between the plate-shaped member 200 and the conveyer belt 300 based on the distances A, B, and C and the angle α. When the plate-shaped member 200 is properly positioned, the plate-shaped member 200 is perpendicular to the conveyer belt 300 and the angle β is then 90 degrees. However, for a number of reasons, the plate-shaped member 200 may not be precisely perpendicular to the conveyer belt 300, and thus there is a need to calculate an exact value of the angle β. As shown in FIG. 2, the thickness L of the plate-shaped member 200 equals to $(K-A-B)*\sin\beta$, wherein K represents the distance between the distance measurers 20 and 30. According to Law of Sines, $\sin\beta = \sin\alpha * C/D$. According to Law of Cosines, $\cos\alpha = (B^2 + C^2 - 2B*C)$. Thus, the thickness $L = (K-A-B) * C/D * \sqrt{1-\cos\alpha^2}$.

While various embodiments have been described and illustrated, the disclosure is not to be construed as being limited thereto. Various modifications can be made to the embodiments by those skilled in the art without departing from the true spirit and scope of the invention as defined by the appended claims.

What is claimed is:

1. A thickness measuring system for measuring a thickness of a planar plate-shaped member placed on a conveyer belt, the system comprising:
   a processor;
   a first distance measurer coupled to the processor and configured to emit a first light beam that is parallel to the conveyer belt, and to receive the first light beam after the first light beam is reflected by the planar plate-shaped member, to calculate a first distance between the first distance measurer and the planar plate-shaped member; and
   a second distance measurer coupled to the processor and configured to emit a second light beam and a third light beam, and to receive the second light beam and the third light beam after the second light beam and the third light beam are reflected by the planar plate-shaped member, to calculate a second distance between the second distance measurer and the planar plate-shaped member and a third distance between the second distance measurer and the planar plate-shaped member, wherein the second light beam is parallel to the conveyer belt and is received by the second distance measurer, and a first angle is formed between the second light beam and the third light beam;
   wherein the processor is configured to calculate a thickness of the plate-shaped member based on the first distance, the second distance, the third distance, the first angle, and a distance between the first distance measurer and the second distance measurer.

2. The thickness measuring system according to claim 1, wherein the first distance measurer and the second distance measurer are laser distance measuring sensors.

3. The thickness measuring system according to claim 1, further comprising a plate-shaped member detecting sensor, wherein the plate-shaped member detecting sensor is configured to detect a presence of the planar plate-shaped member and to signal the processor, and the processor controls the first distance measurer and the second distance measurer to emit the first light beam, the second light beam, and the third light beam.

4. The thickness measuring system according to claim 3, wherein the plate-shaped member detecting sensor comprises a light emitter and light receiver, the light emitter and the light receiver are arranged adjacent to the first distance measurer and the second distance measurer, the light receiver is configured to receive light emitted by the light emitter, when the planar plate-shaped member passes between the first distance measurer and the second distance measurer, the light from the light emitter is blocked, and the light receiver signals the processor.

* * * * *